US012783648B2

(12) United States Patent
Wuest et al.

(10) Patent No.: US 12,783,648 B2
(45) Date of Patent: Nov. 3, 2026

(54) GENERATION OF SIMPLIFIED SECURITY SOFTWARE INTERACTION AND SUMMARIES USING GENERATIVE AI

(71) Applicant: Acronis International GmbH, Schaffhausen (CH)

(72) Inventors: Candid Wuest, Bassersdorf (CH); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 201 days.

(21) Appl. No.: 18/468,197

(22) Filed: Sep. 15, 2023

(65) Prior Publication Data

US 2025/0094572 A1 Mar. 20, 2025

(51) Int. Cl.
*G06F 21/55* (2013.01)
*G06N 3/08* (2023.01)

(52) U.S. Cl.
CPC ............. *G06F 21/554* (2013.01); *G06N 3/08* (2013.01); *G06F 2221/034* (2013.01)

(58) Field of Classification Search
CPC .... G06F 21/554; G06F 2221/034; G06N 3/08
See application file for complete search history.

(56) References Cited

U.S. PATENT DOCUMENTS 8,074,276 B1 12/2011 Beloussov et al.
11,184,335 B1 11/2021 Beloussov et al.
11,210,419 B2 12/2021 Beloussov et al.
2018/0048661 A1* 2/2018 Bird .................... H04L 63/1416
2018/0114018 A1* 4/2018 Zhang ................... G06F 21/562
2018/0373961 A1* 12/2018 Wang ...................... G06N 20/00
2019/0260784 A1* 8/2019 Stockdale ............. H04L 43/045
(Continued)

OTHER PUBLICATIONS

Google. Supercharge security with AI. https://cloud.google.com/security/ai, Security with generative AI _ Google Cloud.pdf as accessed on Feb. 29, 2024.
(Continued)

*Primary Examiner* — Zhe Liu
(74) *Attorney, Agent, or Firm* — ESPE Legal Consultancy FZ-LLC

(57) ABSTRACT

Systems and methods for mitigating potential security incidents. A system includes a data ingestion module, a graphical user interface (GUI), a generative AI model, an enrichment module, and a mitigation module. The generative AI model is pretrained on a large language model (LLM) using a dataset of known security incidents and the computer system's infrastructure, and analyses potential security incidents and generates incident overviews, leveraging its understanding of attack frameworks and previous incident data. The enrichment module incorporates user interactions, enhancing the incident overviews with accurate information. The mitigation module proposes mitigation actions based on the generative AI model's insights gained from prior incidents. The system enables natural language interaction through the GUI and provides graphical representations of the incidents. With its ability to summarize incidents, propose actions, and support user understanding, the system offers an efficient approach to mitigating security incidents.

20 Claims, 4 Drawing Sheets

(56) References Cited

U.S. PATENT DOCUMENTS

| | | | | |
|---|---|---|---|---|
| 2020/0327223 | A1* | 10/2020 | Sanchez | G06F 21/554 |
| 2021/0367961 | A1* | 11/2021 | Kuppa | G06F 40/205 |
| 2022/0046048 | A1* | 2/2022 | Koo | H04L 63/1433 |
| 2022/0300609 | A1* | 9/2022 | Cotaie | G06N 7/01 |
| 2023/0133057 | A1* | 5/2023 | Murthy | G06N 3/04 709/220 |
| 2023/0344858 | A1* | 10/2023 | Litai | H04L 63/1433 |
| 2024/0386066 | A1* | 11/2024 | Sun | G06F 16/9536 |
| 2024/0414211 | A1* | 12/2024 | Boyer | G06F 40/58 |
| 2024/0427879 | A1* | 12/2024 | Bulut | G06F 21/554 |
| 2025/0016183 | A1* | 1/2025 | Sergeev | H04L 63/1441 |
| 2025/0045148 | A1* | 2/2025 | Acharya | G06F 11/079 |

OTHER PUBLICATIONS

Noa Frankel. Purple AI | Empowering Cybersecurity Analysts with AI-Driven Threat Hunting, Analysis & Response. https://www.sentinelone.com/blog/purple-ai-empowering-cybersecurity-analysts-with-al-driven-threat-hunting-analysis-response/, Purple AI _ Empowering Cybersecurity Analysts with Al-Driven Threat Hunting, Analysis & Response—SentinelOne.pdf © 2024.

* cited by examiner

GENERATION OF SIMPLIFIED SECURITY SOFTWARE INTERACTION AND SUMMARIES USING GENERATIVE AI

TECHNICAL FIELD

The present disclosure relates to the field of information system security. More specifically, the present disclosure relates to mitigating a potential security incident in a computer system using a generative AI model.

BACKGROUND

In the context of IT security, the dashboards of various security solutions often contain an abundance of additional details, accessible through specific sub-points. However, in smaller organizations, administrators and IT staff may not possess intimate familiarity with all aspects of these dashboards, making it difficult to grasp the full extent of an incident at first glance. Consequently, during security incidents, these individuals can become overwhelmed and distracted, resulting in potential delays and suboptimal decision-making when mitigating the issue. Efficient incident response relies on the ability to quickly comprehend the situation.

Traditionally, organizations have dealt with this challenge by either hiring more experienced personnel, which can be costly, or investing in continuous training for existing staff, which consumes valuable time and financial resources. Moreover, the current talent shortage in the field of information system security makes it increasingly difficult to hire new professionals, further exacerbating the problem. Rapidly understanding the scope of an incident is critical for enabling efficient and effective response.

To avoid challenges associated with the talent shortage and manual resources, various security solutions and tools have been developed to protect organizations against cyberattacks. With ever increasing sophistication, the security solutions may prefer to employ artificial intelligence and machine learning techniques to detect and mitigate attacks, identify anomalies, and generate alerts and incidents. However, the complexity of the dashboards and interfaces associated with these security solutions can pose challenges for administrators and IT staff, particularly those who are not intimately familiar with the intricacies of the system.

Despite the progress in AI-assisted security solutions, there remains a technical problem in simplifying the interactions and summaries provided by security software dashboards. Many administrators and IT staff, especially in smaller organizations, lack deep familiarity with these dashboards, making it challenging to quickly understand the extent of security incidents at a glance. This can lead to delayed actions, suboptimal solutions, and potentially compromised security.

Therefore, there is a need for improved information system security to simplify security software interactions and provide concise summaries of security incidents, allowing administrators and IT staff to quickly comprehend the situation and take appropriate actions for efficient incident response.

SUMMARY

Embodiments described or otherwise contemplated herein substantially meet the aforementioned needs of the industry. The present disclosure relates to systems and methods for mitigating a potential security incident in a computer system. In embodiments, generative AI is leveraged to simplify security software interactions and provide concise summaries of security incidents.

In a feature and advantage of embodiments, generative AI helps to quickly summarize new security incidents with the knowledge of the local organization. Embodiments can present graphical overviews and allow the user to query for more detailed information, making it simple to understand incidents. In an embodiment, generative AI can be trained on local infrastructure and fed with current incident data to summarize security incidents, instead of using fixed mappings or heuristics to explain the attacks to the user.

In an embodiment, a method includes pretraining a generative AI model based on a large language model (LLM) using a training dataset of known security incidents and an infrastructure of the computer system, the generative AI model further trained in conversational interactions with a user. Once the generative AI model is pretrained, the data associated with a potential security incident is received. The potential security incident is then analyzed using the generative AI model to generate a security incident overview. Further, the security incident overview is presented to a user using a graphical user interface. At least one question is received from the user through the graphical user interface. The at least one question is then answered using the generative AI model. Further, the security incident overview is enriched based on the answer, including presenting the answer to the user using the graphical user interface. Finally, the mitigation action for the potential security incident is proposed.

In one aspect, the generative AI model is pretrained on question-answer pairs based on at least one of a cybersecurity framework or an attack framework.

In one aspect, the generative AI model is pretrained on data from previous security incidents to determine a taxonomy of attacks and an association between attack techniques.

In one aspect, the method includes calibrating the generative AI model based on an infrastructure topology of the computer system. The calibration is repeated at an interval or when the infrastructure has changed.

In one aspect, the data associated with the potential security incident is received from at least one of an EDR (Endpoint Detection and Response) solution, an XDR (Extended Detection and Response) solution, a SIEM (Security Information and Event Management) solution, or a log file.

In one aspect, the method includes triggering data collection, including generating a forensic memory dump of an involved computer, for analysis by the generative AI model.

In one aspect, the user interacts with the generative AI model using a natural language query.

In one aspect, the generative AI model proposes the mitigation action based on previous incidents learned during the training of the large language model.

In an embodiment, a computer system for mitigating potential security incidents is disclosed. The system includes a hardware processor implemented on a computing device, and instructions that, when executed by the hardware processor, cause the hardware processor to operate various components of the system configured to perform various functions by a plurality of computer-implemented components. A data ingestion module is configured to receive data associated with at least one potential security incident. A graphical user interface is configured to present the security incident overview to a user and receive at least one question from the user. A generative AI model pretrained based on a large language model (LLM) using a training dataset of known security incidents and an infrastructure of the computer system. The generative AI model further trained in conversational interactions with a user. The generative AI model is configured to analyze the potential security incident using the generative AI model to generate a security incident overview, and answer the at least one question. The system further includes an enrichment module which is configured to enrich the security incident overview based on the answer, including presenting the answer to the user using the graphical user interface. The system further includes a mitigation module configured to propose a mitigation action for the potential security incident.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
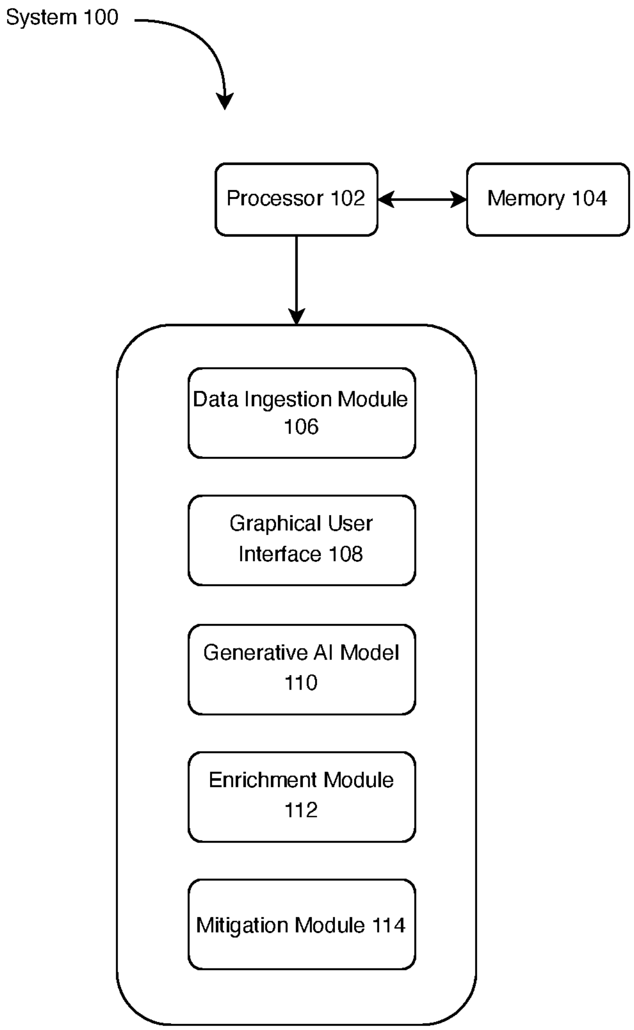
FIG. 1 is a block diagram of a system for mitigating potential security incidents using generative AI, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present invention relates to the field of information system security and, more specifically, to the use of generative artificial intelligence (AI) to simplify security software interactions and provide fast and simple incident overviews. The invention addresses the challenges associated with complex dashboards in IT security solutions, such as antivirus programs, endpoint detection and response (EDR) systems, extended detection and response (XDR) solutions, and security information and event management systems (SIEM).

Referring to FIG. 1, a block diagram of a system 100 for mitigating potential security incidents using generative AI is depicted, in accordance with an embodiment. The system includes, but may not be limited to, a data ingestion module 106, a graphical user interface (GUI 108), a generative AI model 110, an enrichment module 112, and a mitigation module 114. In one embodiment, the system 100 is implemented on a hardware processor 102 and an operably coupled to a memory 104.

In one aspect of the embodiment, the data ingestion module 106 is configured for receiving and processing data associated with potential security incidents from various sources within the computer system environment. The data ingestion module 106 can include a wide range of security solutions, including but not limited to EDR (Endpoint Detection and Response) solutions, XDR (Extended Detection and Response) solutions, SIEM (Security Information and Event Management) solutions, log files, and sensors. The data ingestion module 106, in one example, acts as a data aggregator, collecting information generated by these sources, such as security events, alerts, logs, system telemetry, network traffic data, and other relevant security-related data. The data ingestion module 106 supports various data formats, protocols, and APIs to ensure compatibility and seamless integration with different security solutions and log management systems.

In one aspect, the data collection processes can be triggered to gather additional information pertaining to the potential security incident. Gathering the additional information may include generating a forensic memory dump of a computer involved in the incident. The generated memory dump is then analysed by the generative AI model 110 to extract relevant insights and incorporate them into the incident overview. By utilizing forensic analysis techniques, the generative AI model 110 can gain a deeper understanding of the incident and provide more comprehensive summaries.

In one aspect of the embodiment, the graphical user interface (GUI 108) is configured for presenting the security incident overview to the user and facilitating user interactions with the system. It provides a user-friendly interface that allows administrators and IT staff to access and comprehend the incident information effectively. The GUI 108 presents the incident summaries, graphical visualizations, and other relevant details derived from the generative AI model 110. It enables users to explore and interact with the incident data, ask questions, seek clarification, and provide additional comments.

In accordance with the embodiment, the generative AI model 110 generates comprehensive security incident overviews by leveraging its capabilities to analyze potential security incidents. The generative AI model 110 is pretrained based on a large language model (LLM), which serves as the foundation for its understanding and generation capabilities.

During the pretraining phase, the generative AI model 110 is exposed to a vast dataset comprising known security incidents and information about the infrastructure of the computer system. This dataset encompasses a wide range of security events, attack patterns, incident types, and their corresponding contextual information. The model learns from this dataset to understand the characteristics, patterns, and relationships of security incidents within the specific environment.

By being pretrained on the infrastructure of the computer system, the generative AI model 110 gains insights into the topology, components, and interconnections of the system. This understanding allows the model to contextualize and classify incidents based on the specific environment in which they occur. For example, the generative AI model 110 can recognize different types of endpoints, network segments, servers, applications, user roles, and their relationships within the infrastructure.

Figure 3:
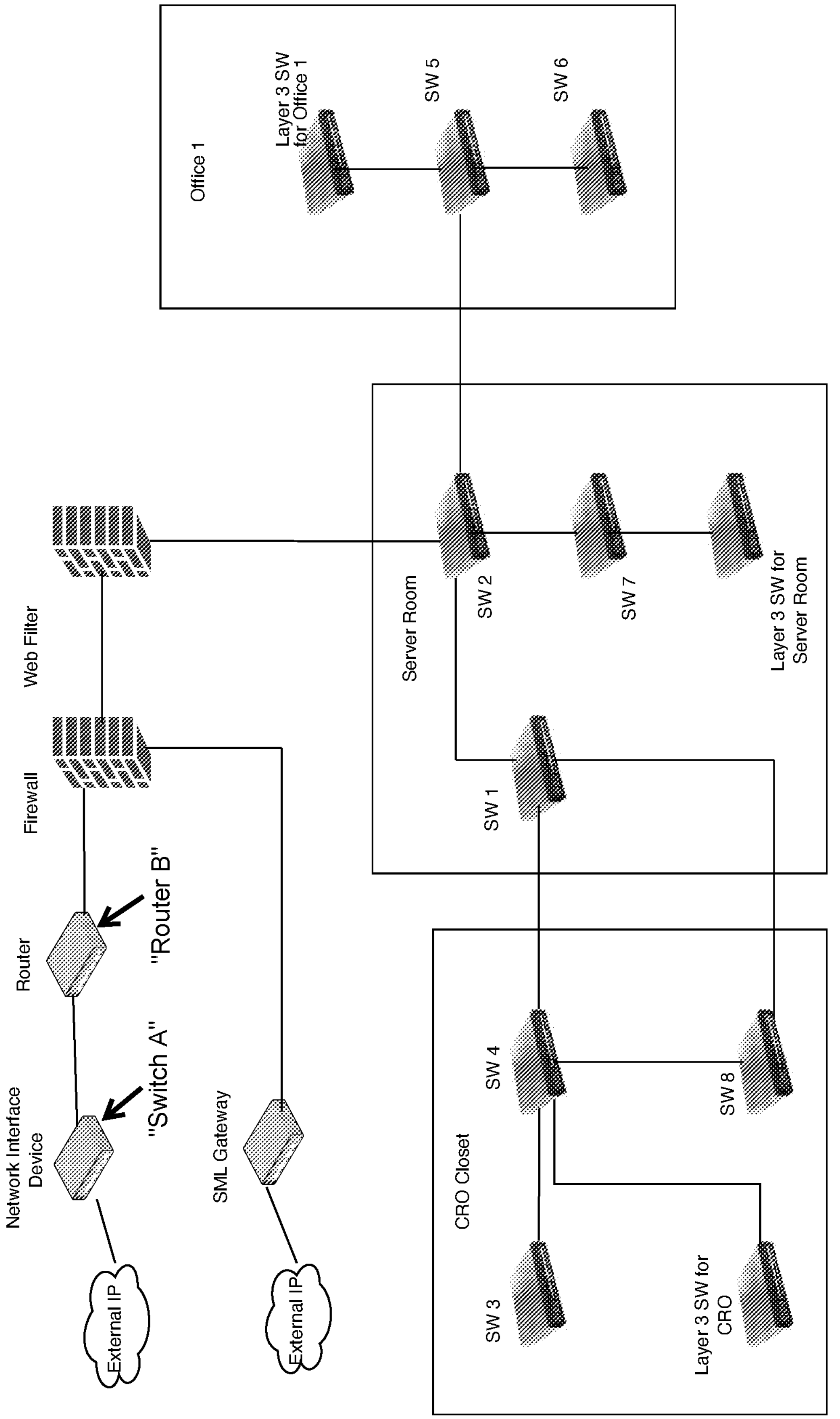
FIG. 3 is a block diagram of an example network diagram used for pretraining, in accordance with an embodiment.

Referring to FIG. 3, a block diagram of an example network diagram used for pretraining is depicted, in accordance with an embodiment. For example, a network diagram including topology information such as nodes, endpoints, network groupings, and their interconnections are depicted. In an embodiment, upon the example network diagram being used as an input to training of generative AI model 110, various feature vectors can be extracted and used for training. For example, a feature vector can include an endpoint, its connections, and associated metadata. This can also include server endpoints with associated running services, open ports and access policies. In one example, the feature vectors can be utilized to train the generative AI model 110 for numerical representation of words for Natural Language Processing (NLP) and forming a base for deep learning models for NLP.

In particular, in the example illustrated in FIG. 3, CISCO enterprise-class switches and layer 3 switches are interconnected in a network grouping for creation of a feature vector. FIG. 3 is provided by way of mere example only, as network configurations are subject to change based on many factors, including enterprise infrastructure.

The example, as depicted by FIG. 3, is a complex corporate network that comprises routers, switches, gateways, and security components, such as a firewall. In one aspect, a specific path, for example, Employee Workstation to Data Center Server, within the network topology, highlighting the elements involved and how they contribute to the feature vector is provided herein. According to the aspect, Switch A is configured as an access layer. Switch A serves as the entry point for the employee's workstation. Examples of vectors may include number of active port, VLAN configuration for separating traffic, and traffic load and patterns. Further, in accordance with the embodiment, Router B is configured as a distribution layer. The router connects multiple access switches to the core of the network. Examples of the feature vectors can include aspects of routing protocols in use (e.g., OSPF, BGP), number of connected access switches, bandwidth allocation for different services, and features of directly reachable devices. Furthermore, the network topology as depicted in the example implements a firewall as a security layer. This firewall monitors and controls traffic between internal and external networks. Examples of the feature vector may include intrusion detection/prevention settings, security policies (allow/block rules), and network address translation (NAT) configurations. The example further illustrates an implementation of a router in the network topology as a core layer. At the core of the network, the router facilitates efficient data routing. The relevant feature vector may encompass overall network load, redundancy and failover configurations, and quality of Service (QoS) settings. The exemplary network topology further includes next generation Web Filter implemented as a security component. This security appliance ensures data security and threat prevention. The feature vectors may include Antivirus and anti-malware settings, application and content filtering rules, and threat intelligence updates.

When constructing a feature vector for training the AI model, relevant attributes from each element are extracted and compiled. For instance, the AI model might learn that a sudden increase in traffic load at Switch A could lead to congestion at Router B, affecting overall network performance. By analyzing these feature vectors, the AI model can make predictions about network behavior, optimize routing decisions, detect anomalies, and even suggest improvements to enhance network efficiency and security.

FIG. 3 further illustrates components for which data points in the vector can be included, such as the Stateful multilayer (SML) gateway, providing additional context to the AI model's training. By constructing and analyzing such feature vectors, the AI model gains the capability to predict network behavior, optimize routing decisions, and detect irregularities, contributing to an elevated level of network efficiency and security. This particular path is just one instance of utilizing feature vectors within the broader network topology, showcasing the adaptability of this approach across various communication pathways. Other data points for feature vectors can likewise be utilized.

In one aspect, the generative AI model 110 is trained using question-answer pairs derived from a cybersecurity framework or an attack framework. For example, the National Institute of Standards and Technology (NIST) cyber security framework and the MITRE Adversarial Tactics, Techniques, and Common Knowledge (ATT&CK) framework. The training phase enhances the model's understanding of the specific terminology, concepts, and techniques related to cybersecurity incidents. By incorporating knowledge from established frameworks, the generative AI model 110 gains a deeper understanding of the domain-specific information required to analyze and summarize security incidents accurately.

In one aspect, the generative AI model 110 is pretrained using historical data from previous security incidents. The training enables the generative AI model 110 to establish a taxonomy of attacks, categorize incidents based on their attributes, and identify associations between different attack techniques. The use of historical data helps the generative AI model 110 in generating incident overviews that capture the underlying nature of the security incidents effectively.

In one aspect, the system 100 is configured for calibrating the generative AI model 110 based on the infrastructure topology of the computer system. The calibration process involves training the model on information, such as network diagrams, Configuration Management Database (CMDB) data, hardware and software inventory, and other relevant details regarding the organization's infrastructure. By understanding the specific configuration and components of the system, the generative AI model 110 can provide accurate incident overviews that align with the organization's unique environment. The calibration process can be repeated periodically or triggered when changes occur in the infrastructure to ensure the model's ongoing alignment with the system's current state.

Using its learned logic, the generative AI model 110 analyzes the potential security incidents received by the system 100. The generative AI model 110 applies its understanding of attack patterns, known incident types, and the interplay of various factors within the infrastructure to generate comprehensive security incident overviews. For example, the generative AI model 110, in the background, is fed with the task to "create an incident overview", and provided with the new incident metadata. These comprehensive security incident overviews provide a concise summary of the incident, including details, such as the nature of the attack, affected systems or entities, potential data exfiltration or damage, and any relevant contextual information.

Furthermore, in one aspect, the exact query to be used for the LLM can be preconfigured to select, for example, if any visuals have to be generated. The query pre-configuration allows the generative AI model 110 to map the query with the previously learned corporate infrastructure and security techniques.

The goal of the generative AI model 110 is to create a simple-to-understand summary of the incident. The generative AI model 110 generates human-readable and coherent incident overviews as a text in natural language format and supported with a graphical overview of the affected systems and the data flows. These overviews serve as valuable insights for administrators and IT staff, enabling users to quickly grasp the key details and implications of the incidents. The generative AI model 110's ability to generate plain language summaries simplifies the comprehension of complex security events, empowering users to make informed decisions and take appropriate actions for incident response.

In an example of creation of the summary, the generative AI model 110 analyzes the incident and creates a summary explaining that a malware was received by a malicious email and was detected on a workstation of user Jenny in the marketing department. The malware accessed the stored Chrome browser passwords in file X and the Bitcoin wallet "wallet.dat" and sent them to a remote location at the IP address 10.2.3.4 in the UK. Accordingly, the summary can present natural language text describing the malicious email (e.g. "Malware was received by a malicious email and was detected on a workstation of user Jenny in the marketing department. The malware accessed the stored Chrome browser passwords in file X and the Bitcoin wallet "wallet-.dat" and sent them to a remote location at the IP address 10.2.3.4 in the UK", simple images of the parties (e.g. a block diagram of Jenny's workstation and its interaction with the email and subsequent operations on the Bitcoin wallet and remote address), or a combination thereof.

In another example, a summary of an attack in which a ransomware was spreading from a workstation of John in engineering to the workstation of Paul and Frank in the same department. The spreading used the password of John and the system tool PsExec. The ransomware then tried to encrypt 10 files in the Documents folder but was blocked and deleted by the XDR solution. The generative AI can map the IP and system names to more meaningful names, such as email server or sharepoint server. The generative AI can also map files like for example "C:\Users\Jenny\AppData\Roaming\Bitcoin\wallet.dat" to the context of being a Bitcoin wallet file.

The generative AI model 110, in one implementation, also generates a graphical overview of the important involved network and system parts with an indication of what happened in which sequence and where. For example, the graphical overview can be a graphic showing the systems involved and data flow in a static image, or an animated graphic of the network.

Figure 4:
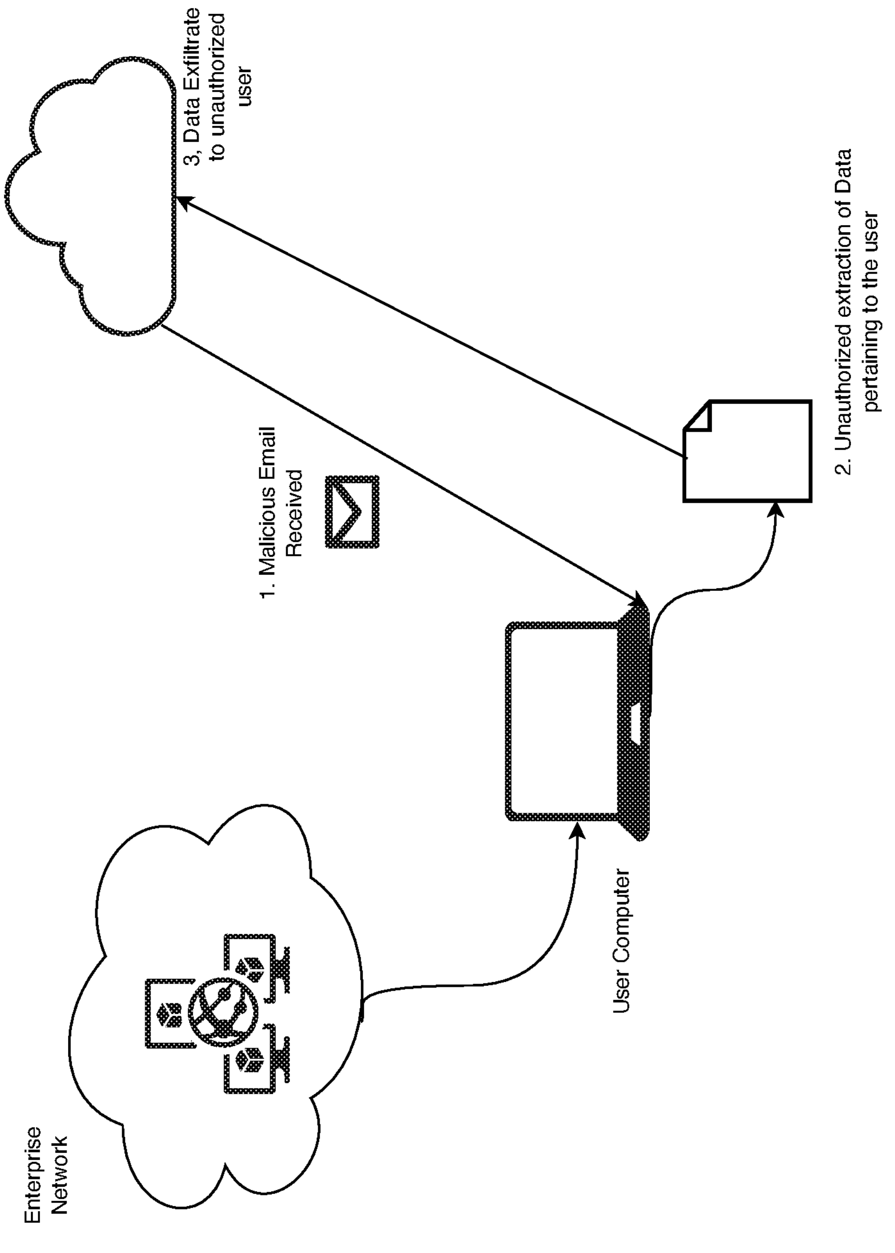
FIG. 4 is a block diagram of a graphical summary of an attack, according to an embodiment.

In the example of the malicious email on Jenny's workstation above, referring to FIG. 4, a block diagram of a graphical summary of an attack is depicted, according to an embodiment. As illustrated, the summary depicts easily understood blocks of the relevant parties and their interaction, with natural language text describing the attack. Further, the summary depicts the sequence of events that can be readily understood. As depicted in FIG. 4, a plurality of user computers are connected in an enterprise network. At one instance, a user computer is operated by a user, for example, Jenny. Jenny's user computer may receive a malicious email containing a malicious threat (e.g. [1]). Upon clicking on the malicious threat, data related to the user may be extracted without authorization from the user (e.g. [2]). For example, passwords, bitcoin wallet, and other personal data may be stolen. The stolen data is then exfiltrated to an unauthorized user (e.g. [3]).

The generative AI model's 110 analysis, in one aspect, incorporates the incident data received from the data ingestion module 106, such as alerts, logs, system telemetry, network traffic data, and other relevant information. By processing this data in conjunction with its pretrained knowledge, the model can accurately assess and interpret the potential security incidents within the context of the specific computer system.

The generated information, as a summary, is then presented to a user through various communication modes. In one example, the information is provided on a dashboard. In another example, the information is sent to the user by an Electronic Mail (email) or made available on an instant messaging service over a communication network.

The enrichment module 112, in one aspect, is configured to enhance the incident overview generated by the generative AI model 110. The enrichment module 112 leverages the answers provided by the generative AI model 110 to refine and enrich the incident summary, ensuring that the user receives accurate and relevant information.

When users interact with the system through the graphical user interface (GUI 108) and ask questions or seek clarification, the generative AI model 110 responds with answers based on its pretrained knowledge and understanding of the incidents. The enrichment module 112 captures these answers and incorporates them into the incident summary, augmenting the existing information with additional context, details, or insights. The user, in one aspect, is provided with an option to interact with the generative AI model 110, and ask further clarification questions where needed, or provide additional comments to enrich the summary. For example, the user can ask to see a listing of all affected files or check what department user John, whose workstation may have been subjected to the ransomware attack, belongs to. Such user and AI interaction can happen with natural language queries which are directly interpreted by the LLM and are not translated into SQL queries or other syntaxes. This aspect results in generating additional information or graphics which are then consequently updated.

By incorporating the answers provided by the generative AI model 110, the enrichment module 112 ensures that the incident overview remains up-to-date and aligned with the specific queries or information sought by the users. This iterative enrichment process helps deliver more comprehensive and accurate incident summaries to the users, improving their understanding of the incidents and facilitating effective decision-making and incident response.

The mitigation module 114, in one aspect of the embodiment, is configured for proposing appropriate mitigation actions for the potential security incidents. The mitigation actions are derived from previous incidents that were learned during the training of the large language model (LLM) used in the generative AI model 110. Such actions depend on the capabilities of the security solution or the ones of any connected Security orchestration, automation, and response (SOAR) tools. The SOAR tool is a stack of compatible software programs that enables an organization to collect data about security threats and respond to security events with little or no human assistance.

During the pretraining phase, the LLM is exposed to a comprehensive dataset of known security incidents. This dataset includes information about the types of attacks, their characteristics, and the corresponding mitigation actions that were effective in previous incidents. The generative AI model 110 learns from this dataset, enabling it to generate incident overviews and propose relevant mitigation actions based on its learned knowledge.

The proposed mitigation actions can encompass a range of measures, such as terminating processes, restoring files, isolating computers from the network, implementing access controls, updating security configurations, or any other relevant steps to mitigate the incidents effectively. The mitigation module 114 considers the incident characteristics, contextual information, and the best practices learned from previous incidents to suggest the most appropriate and effective actions for each specific incident.

By leveraging the knowledge and insights derived from previous incidents, the mitigation module 114 provides valuable guidance to administrators and IT staff, assisting them in taking prompt and informed actions to mitigate potential security incidents. This proactive approach helps minimize the impact of incidents, reduce response time, and enhance the overall security posture of the computer system.

The system of the present disclosure is at least partially embodied in the form of computer-implemented processes and apparatus for practicing those processes. The disclosed methods are also at least partially embodied in the form of tangible, non-transitory machine-readable storage media encoded with computer program code. The media may include, for example, RAMS, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. When implemented on the processor 102, the computer program code segments configure the processor 102 to create specific logic circuits. The methods may alternatively be at least partially embodied in a digital signal processor formed of application specific integrated circuits for performing the methods.

Any of the modules and components depicted as being operated by the processor may include any combination of software, firmware, and/or hardware. The software and/or firmware may include computer-executable code, instructions, or the like that may be loaded into the memory for execution by one or more of the processor(s). Any of the components depicted as being stored in data storage may support functionality described in reference to correspondingly named components earlier in this disclosure.

The processor(s) may be configured to access the memory and execute computer-executable instructions loaded therein. For example, the processor(s) may be configured to execute computer-executable instructions of the various program component(s), applications, engines, or the like of the computing device to cause or facilitate various operations to be performed in accordance with one or more embodiments of the disclosure. The processor(s) may include any suitable processing unit capable of accepting data as input, processing the input data in accordance with stored computer-executable instructions, and generating output data. The processor(s) may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) may be capable of supporting any of a variety of instruction sets.

It should further be appreciated that the system may include alternate and/or additional hardware, software, or firmware components beyond those described or depicted without departing from the scope of the disclosure. More particularly, it should be appreciated that software, firmware, or hardware components depicted as forming part of the computing device are merely illustrative and that some components may not be present or additional components may be provided in various embodiments. While various illustrative program component(s) have been depicted and described as software component(s) stored in data storage, it should be appreciated that functionality described as being supported by the program component(s) may be enabled by any combination of hardware, software, and/or firmware. It should further be appreciated that each of the above-mentioned component(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular component may, in various embodiments, be provided at least in part by one or more other component(s). Further, one or more depicted component(s) may not be present in certain embodiments, while in other embodiments, additional component(s) not depicted may be present and may support at least a portion of the described functionality and/or additional functionality. Moreover, while certain component(s) may be depicted and described as sub-component(s) of another component, in certain embodiments, such component(s) may be provided as independent component(s) or as sub-component(s) of other component(s).

In an aspect, the communication between the user and the system may be facilitated through a communication network. The network may include certain communication protocols, such as TCP/IP, http, https, ftp, and sftp protocols, over one or more communication network. Here, the communication network can be but is not limited to, internet, intranet, wide area network (WAN), local area network (LAN), wireless network, Bluetooth, WiFi, and mobile communication network. The user computing device can be utilized by system users to interact with (e.g., send or receive electronic messages to and from) the electronic system through the network. In some embodiments, the user computing device is a mobile/hand-held device, such as a tablet, iPhone, iPad, Google's Android device, and/or other types of mobile communication device, PC, such as laptop PC and desktop PC, and a server machine.

The system 100 of the present disclosure is at least partially embodied in the form of computer-implemented processes and apparatus for practicing those processes. The disclosed methods are also at least partially embodied in the form of tangible, non-transitory machine-readable storage media encoded with computer program code. The media may include, for example, RAMS, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. When implemented on the processor, the computer program code segments configure the processor to create specific logic circuits. The methods may alternatively be at least partially embodied in a digital signal processor formed of application specific integrated circuits for performing the methods.

Figure 2:
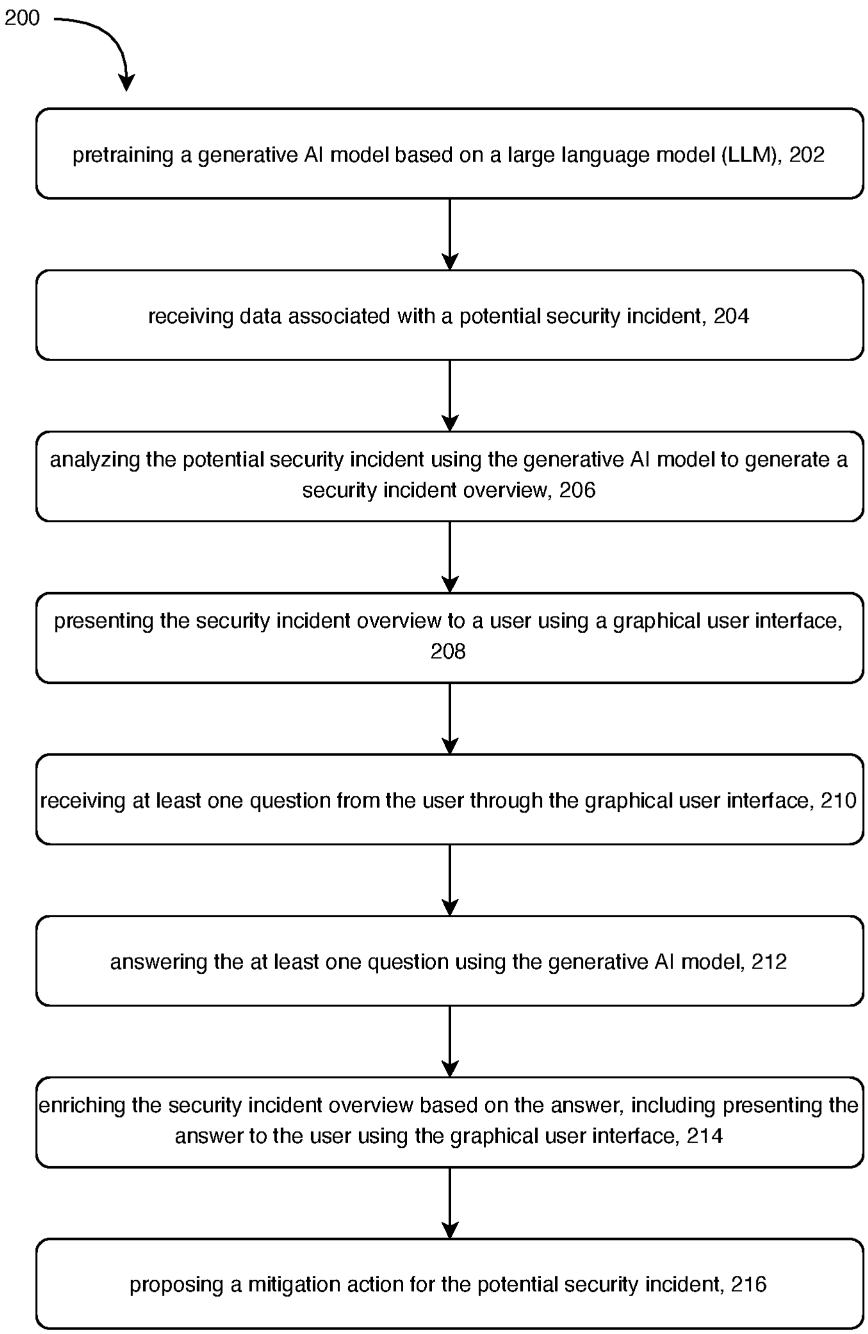
FIG. 2 is a flowchart of a method for mitigating potential security incidents using generative AI, in accordance with an embodiment.

Referring to FIG. 2, a flowchart of a method 200 for mitigating potential security incidents in a computer system using generative AI technology is depicted, in accordance with an embodiment. The method can be implemented on a system as described with reference to FIG. 1, such as the system 100.

At 202, the method 200 includes pretraining of a generative AI model 110 based on a large language model (LLM). The generative AI model 110 is pretrained using a dataset of known security incidents and the infrastructure of the computer system. Additionally, the generative AI model 110 is further trained in conversational interactions with a user, enabling the generative AI model 110 to understand natural language queries.

At 204, data associated with a potential security incident is received by the system 100. This data can come from various sources such as EDR solutions, XDR solutions, SIEM solutions, log files, or sensors. The data provides information about the security incident that needs to be analyzed.

At 206, the generative AI model 110 analyzes the received data to generate a security incident overview. The generative AI model 110 utilizes its pretrained knowledge and understanding of security incidents, taxonomy of attacks, associations between attack techniques, and the associated infrastructure of the computer system to classify and summarize the incident accurately.

At 208, the generated security incident overview is presented to the user through a graphical user interface (GUI 108). The GUI 108 may include at least one of textual information, graphical representations, or other relevant display components to facilitate a comprehensive understanding of the incident.

At 210, the user interacts with the system by asking questions or seeking clarification through the GUI 108. The questions can be in natural language format, enabling a conversational interaction with the generative AI model 110.

At 212, the generative AI model 110 responds to the user's questions by providing accurate answers based on its trained knowledge and understanding of security incidents.

At 214, the answers provided by the generative AI model 110 are incorporated into the security incident overview, enriching the existing information. The system's enrichment module 112 ensures that the incident summary remains up-to-date, accurate, and relevant by integrating the additional context and insights obtained from the generative AI model 110.

At 216, based on the information learned from previous incidents during the training of the large language model, the system's mitigation module 114 proposes appropriate mitigation actions for the potential security incident. These actions can include various measures such as terminating processes, restoring files, isolating computers from the network, or other relevant actions to mitigate the incident effectively.

Optionally, though not depicted in FIG. 2, the generative AI model 110 can be re-trained based on the instant security incident, the overview, the questions asked and answered, and the mitigation actions for the instant security incident. For example, if certain questions are routinely asked, the generative AI model 110 can be updated to include answers to these questions in the initial overview presented. The generative AI model 110 is thereby improved based on additional real-world data.

The invention claimed is:

1. A computer-implemented method of mitigating a potential security incident in a computer system, the method comprising:

pretraining a generative AI model based on a large language model (LLM) using a training dataset of known security incidents and a hardware infrastructure topology of the computer system, the generative AI model further trained in conversational interactions with a user, wherein the hardware infrastructure topology includes at least one node, at least one network element, and at least one interconnection between infrastructure elements defining a physical communication path;

receiving data associated with a potential security incident;

analyzing the potential security incident using the generative AI model to generate a security incident overview;

presenting the security incident overview to a user using a graphical user interface, wherein the security incident overview is graphically depicted on a dashboard display having a plurality of graphical elements including graphical elements for one or more computer system components associated with the potential security incident and a graphically-depicted sequence of events associated with the potential security incident;

receiving at least one question about the security incident overview from the user through the graphical user interface;

answering the at least one question using the generative AI model;

enriching the security incident overview based on the answer, including modifying the security incident overview using the answer by augmenting at least one of the graphical elements for one or more computer system components or the graphically-depicted sequence of events in the dashboard display and presenting the modified security incident overview to the user using the graphical user interface; and proposing a mitigation action for the potential security incident.

2. The method of claim 1, wherein the generative AI model is pretrained on question-answer pairs based on at least one of a cybersecurity framework or an attack framework.

3. The method of claim 1, wherein the generative AI model is pretrained on data from previous security incidents to determine a taxonomy of attacks and an association between attack techniques.

4. The method of claim 1, further comprising calibrating the generative AI model based on the hardware infrastructure topology of the computer system using at least one network diagram, and wherein the calibration is repeated at an interval or when the infrastructure has changed.

5. The method of claim 1, wherein the data associated with the potential security incident is received from at least one of an EDR (Endpoint Detection and Response) solution, an XDR (Extended Detection and Response) solution, a SIEM (Security Information and Event Management) solution, or a log file.

6. The method of claim 1, further comprising triggering data collection, including generating a forensic memory dump of an involved computer, for analysis by the generative AI model.

7. The method of claim 1, wherein the user interacts with the generative AI model using a natural language query.

8. The method of claim 1, wherein the generative AI model proposes the mitigation action based on previous incidents learned during the training of the large language model.

9. The method of claim 1, wherein the generative AI model is further configured to generate a summary of the potential security incident in plain natural language.

10. A computer system for mitigating potential security incidents, the system comprising:

a hardware processor implemented on a computing device; and a data ingestion module comprising a set of instructions executable on the hardware processor and configured to receive data associated with at least one potential security incident;

a graphical user interface configured to present a security incident overview to a user, wherein the security incident overview is graphically depicted on a dashboard display having a plurality of graphical elements including graphical elements for one or more computer system components associated with the potential security incident and a graphically-depicted sequence of events associated with the potential security incident and receive at least one question from the user about the security incident overview;

a generative AI model pretrained based on a large language model (LLM) using a training dataset of known security incidents and a hardware infrastructure of the computer system, the generative AI model further trained in conversational interactions with the user, and the hardware infrastructure topology of the computer system including at least one node, at least one network element, and at least one interconnection between infrastructure elements defining a physical communication path, and configured to:

analyze the potential security incident using the generative AI model to generate the security incident overview, and answer the at least one question;

an enrichment module comprising a set of instructions executable on the hardware processor and configured to enrich the security incident overview based on the answer, including modifying the security incident overview using the answer by augmenting at least one of the graphical elements for one or more computer system components or the graphically-depicted sequence of events in the dashboard display and presenting the modified security incident overview to the user using the graphical user interface; and a mitigation module comprising a set of instructions executable on the hardware processor and configured to propose a mitigation action for the potential security incident.

11. The computer system of claim 10, further comprising a calibration module comprising a set of instructions executable on the hardware processor and configured to calibrate the generative AI model based on the hardware infrastructure topology of the computer system using at least one network diagram.

12. The computer system of claim 11, wherein the calibration is repeated at an interval or when the infrastructure has changed.

13. The computer system of claim 10, wherein the data ingestion module is configured to receive the data associated with the at least one potential security incident from one or more security solutions, a SIEM (Security Information and Event Management) solution, a log file, or a sensor.

14. The computer system of claim 10, wherein the mitigation module is further configured to propose the mitigation action for the potential security incident based on previous incidents learned during the training of the large language model.

15. The computer system of claim 10, wherein the generative AI model is further configured to generate a graphical overview of the computer system and data flows related to the potential security incident.

16. The computer system of claim 10, wherein the generative AI model is further configured to map IP addresses and system names to meaningful names based on a corporate environment.

17. The computer system of claim 10, wherein the generative AI model is pretrained on question-answer pairs based on at least one of a cybersecurity framework or an attack framework.

18. The computer system of claim 10, wherein the generative AI model is pretrained on data from previous security incidents to determine a taxonomy of attacks and an association between attack techniques.

19. The computer system of claim 10, wherein the data associated with the potential security incident is received from at least one of an EDR (Endpoint Detection and Response) solution, an XDR (Extended Detection and Response) solution, a SIEM (Security Information and Event Management) solution, or a log file.

20. A non-transitory computer-readable storage medium storing instructions that, when executed by a processor, cause the processor to perform a method of mitigating potential security incidents in a computer system, the method comprising:

pretraining a generative AI model based on a large language model (LLM) using a training dataset of known security incidents and a hardware infrastructure topology of the computer system, the generative AI model further trained in conversational interactions with a user, wherein the hardware infrastructure topology includes at least one node, at least one network element, and at least one interconnection between infrastructure elements defining a physical communication path;

receiving data associated with a potential security incident;

analyzing the potential security incident using the generative AI model to generate a security incident overview;

presenting the security incident overview to a user using a graphical user interface, wherein the security incident overview is graphically depicted on a dashboard display having a plurality of graphical elements including graphical elements for one or more computer system components associated with the potential security incident and a graphically-depicted sequence of events associated with the potential security incident;

receiving at least one question from the user about the security incident overview via the graphical user interface;

answering the at least one question using the generative AI model;

enriching the security incident overview based on the answer by augmenting at least one of the graphical elements for one or more computer system components or the graphically-depicted sequence of events in the dashboard display, including modifying the security incident overview using the answer and presenting the modified security incident overview to the user using the graphical user interface; and proposing a mitigation action for the potential security incident.

* * * * *